(12) United States Patent
Tamizkar

(10) Patent No.: US 10,904,145 B2
(45) Date of Patent: Jan. 26, 2021

(54) METHODS, SYSTEM AND APPARATUSES FOR ROUTING DATA PACKETS IN A NETWORK TOPOLOGY

(71) Applicant: Telia Company AB, Solna (SE)

(72) Inventor: Babak Tamizkar, Stockholm (SE)

(73) Assignee: Telia Company AB, Solna (SE)

( * ) Notice: Subject to any disclaimer, the term of this patent is extended or adjusted under 35 U.S.C. 154(b) by 28 days.

(21) Appl. No.: 16/006,250

(22) Filed: Jun. 12, 2018

(65) Prior Publication Data

US 2018/0375769 A1 Dec. 27, 2018

(30) Foreign Application Priority Data

Jun. 26, 2017 (SE) ...................................... 1750815

(51) Int. Cl.
| | | |
|---|---|---|
| *H04L 12/741* | (2013.01) | |
| *H04L 12/751* | (2013.01) | |
| *H04L 12/715* | (2013.01) | |
| *H04L 12/801* | (2013.01) | |

(52) U.S. Cl.
CPC ............ *H04L 45/745* (2013.01); *H04L 45/02* (2013.01); *H04L 45/64* (2013.01); *H04L 47/17* (2013.01)

(58) Field of Classification Search
CPC ....... H04L 45/00; H04L 45/74; H04L 45/745; H04L 47/17
See application file for complete search history.

(56) References Cited

U.S. PATENT DOCUMENTS

| | | | | |
|---|---|---|---|---|
| 6,980,524 B1* | 12/2005 | Lu | ........................... | H04L 45/04 370/254 |
| 7,554,988 B2 | 6/2009 | Zhang et al. | | |
| 8,351,921 B2* | 1/2013 | Bell | ........................ | H04W 4/10 455/422.1 |
| 2003/0067912 A1* | 4/2003 | Mead | ................ | H04L 29/12018 370/389 |
| 2004/0047350 A1 | 3/2004 | Zhang et al. | | |

(Continued)

FOREIGN PATENT DOCUMENTS

| | | |
|---|---|---|
| EP | 2413540 A1 | 1/2012 |
| WO | WO/2002/019624 A2 | 3/2002 |

OTHER PUBLICATIONS

European Search Report, Patent Application No. 18177010.8-1213, dated Oct. 5, 2018; European Patent Office, Munich, Germany.

(Continued)

*Primary Examiner* — Rhonda L Murphy
(74) *Attorney, Agent, or Firm* — Burr & Forman LLP; Jeffrey H. Kamenetsky (57) ABSTRACT

The embodiments herein relate to methods, a system and routers. One method includes assigning, to each router, at least one zone-ID; building a zone table based on the zone ID; exchanging each zone table between all routers in the network; building, for each router, a routing table; receiving, at a source router, a data packet from a host belonging to a zone of the source router; including a destination address of a host belonging to a network having a network ID; determining which destination zone-ID the destination address or the network ID is associated with; adding or including the destination zone-ID to the data packet; and sending the data packet towards a destination router having the assigned destination zone-ID indicated in the data packet.

23 Claims, 6 Drawing Sheets

(56) References Cited

U.S. PATENT DOCUMENTS

| | | | |
|---|---|---|---|
| 2010/0265955 A1 | 10/2010 | Park et al. | |
| 2011/0096782 A1* | 4/2011 | Park | H04L 29/12367 370/392 |
| 2011/0305242 A1* | 12/2011 | Miki | H04L 49/3009 370/392 |
| 2012/0057502 A1* | 3/2012 | O'Neill | H04L 45/58 370/254 |
| 2015/0063166 A1* | 3/2015 | Sif | G06F 9/45558 370/254 |

OTHER PUBLICATIONS

Swedish Search Report, App. No. 1750815-1, dated Dec. 22, 2017, pp. 1-2, Swedish Patent and Registration Office, Stockholm, Sweden, Ralf Bostrom.

* cited by examiner

METHODS, SYSTEM AND APPARATUSES FOR ROUTING DATA PACKETS IN A NETWORK TOPOLOGY

TECHNICAL FIELD

The present disclosure relates to the field of data communications, and in particular to methods, a system and apparatuses in the form of routers for routing data packets in a network topology using an improved routing protocol that is based on zones.

BACKGROUND

There exist hundreds of different network protocols created for supporting communication between computers and other types of electronic devices. Routing protocols are the family of network protocols that enable computer routers to communicate with each other and in turn to intelligently forward traffic between respective networks. In general, a network routing protocol performs functions which include: discovery, which means identifying other routers on the network; routing management for keeping track of all possible destinations (for network messages or data packets) along with some data describing the pathway; and path determination for making dynamic decisions for where to send each network message or data packet.

Examples of routing protocols include Interior Gateway Protocol (IGP) and Exterior Gateway Protocol (EGP).

IGP is a routing protocol which is used to find network path information within an autonomous system, for example a system of corporate local area networks. The gateways (hosts with routers) use this protocol for exchanging routing information in-between. The routing information can then be used by the Internet protocol (IP) or other network protocols to specify how to route transmissions (or data packets). Known IGPs are Routing Information protocol (RIP); Interior Gateway Routing Protocol (IGRP), Open Shortest Path First (OSPF) and Intermediate System to Intermediate System (IS-IS). There is also an Enhanced IGRP (EIGRP) which supports classless IP subnets and improves the efficiency of the routing algorithms compared to IGRP.

EGP is a routing protocol which is used to find network path information between different autonomous systems. EGP is commonly used in the Internet to exchange routing table information. The Border Gateway Protocol (BGP) is an example of EGP. BGP detects modifications to routing tables and selectively communicates those changes to other routers over TCP/IP. Internet providers commonly use BGP to join their networks together.

Another way to route packets is by using Multi-Protocol Label Switching (MPLS) which uses labels attached to packets to forward them through the network. The MPLS labels are advertised between routers. The IP packets are prefixed by these labels and forwarding is done on the basis of these labels and not by a destination IP address which means forwarding of packets is based on lookup of labels rather than a lookup of the IP addresses, hence speeding up the routing procedure. For example, if Router A wishes to send a data packet to Router E, Router A will insert a header in the data packet with a label stack that contains information about the data packet, where it came from, and where it is going. Router A will then send the data packet to Router B, Router B will send the data packet to Router C, Router C will send the data packet to Router D, and Router D will send the data packet to Router E. Each Router strips away past labels and adds new ones in order to keep forwarding the data packet to where it needs to go. Hence, within each router, the incoming label is examined and its next hop is matched with a new label. The old label is replaced with the new label for the packet's next destination, and then the freshly labeled packet is sent to the next router. Each router repeats the process until the packet reaches an egress router.

MPLS is often referred to as the Layer 2.5 in between the Data Link layer (Layer 2) and Network layer (Layer 3) of the seven-layer OSI model (Open Systems Interconnection model) because of where it operates.

There are, however, several problems with current routing protocols. For instance, they require a long list of entries in routing tables, and need to be updated whenever there are changes in the network. Label switching using MPLS achieves faster routing but MPLS need to be run over another routing protocol for it to work. This means that two protocols need to run in parallel in each router and due to that the required resources are doubled. Further, in MPLS each router needs to generate a new label to replace the old label as explained above.

There is therefore a need for new methods, a system and apparatuses of routing packets in a network topology that require less consumption of resources, achieve fast routing of packets through fast decision making at each router and provide reduction in size of routing tables.

SUMMARY

It is an object of embodiments herein to solve the above problems by providing methods, a system and apparatuses (router devices) for routing packets in a network topology.

According to an aspect of embodiments herein, there is provided a method for routing packets in a network topology; the method comprising: assigning, to each router in the network topology, at least one (unique) one identification number, zone-ID; building, for each zone, a zone table including at least the zone-ID; exchanging each zone table between all routers belonging to the network topology; building, for each router, a routing table so that the routers can reach each other. The method further comprising: receiving, at a source router, a data packet from a host belonging to a zone of the source router; wherein the data packet includes a destination address of a host belonging to a network having a network ID; determining, from the zone table of the source router, to which destination zone-ID the destination address or the network ID is associated with; adding or including the destination zone-ID to the data packet; and sending the data packet towards the destination router having the assigned destination zone-ID indicated in the data packet.

According to an embodiment, sending the data packet comprises determining, from the routing table of the source router, whether there is at least a next hop router before reaching the destination zone-ID and if there is at least a next hop router before reaching the destination zone-ID, sending the data packet to the next hop router. The method further comprises, determining, by the next hop router when it receives the data packet, if the destination zone-ID in the received packet differs from the zone-ID assigned to the next hop router, and if the destination zone-ID in the received packet differs from the zone-ID assigned to the next hop router, determining from the routing table of the next hop router, the address of the subsequent next hop router. If the subsequent next hop router is the destination router, removing, by destination router the zone-ID from the received data packet and forwarding the data packet to the destination address of the host belong to the network having the network ID in the zone of the destination router.

According to another aspect of embodiments herein, there is provided a router (or routing device) for routing data packets in a network topology comprising a plurality of routers, the router being assigned at least one own zone-ID. The other routers in the topology are also each assigned at least one own zone-ID. The router being configured to: build a zone table including at least the zone-ID assigned to the router; exchange the zone table with the plurality of routers; receive zone tables from the plurality of routers; build a routing table for communicating with the plurality of routers; receive a data packet from a host belonging to the zone of the router, wherein the data packet includes the destination address of a host belonging to a network having a network ID. The router is further configured to determine, from the zone table, to which destination zone-ID the destination address of the network ID is associated with; add or include the destination zone-ID in the data packet and send the data packet towards a destination router having the assigned destination zone-ID indicated in the data packet.

According to another aspect of embodiments herein, there is provided a system for routing of data packets in a network topology comprising a plurality of routers, the system being configured to: assign, to each router in the network topology, at least one zone identification number, zone-ID; build, for each zone-ID, a zone table including the zone-ID; each router having an own zone table; exchange each zone table between all routers; build, for each router, a routing table so that the routers can reach each other. A source router in the system or network topology is configured to receive, a data packet from a host belonging to a zone of the source router, wherein the data packet includes a destination address of a host belonging to a network having a network ID. The source router is further configured to determine, from the zone table, to which destination zone-ID the destination address or the network ID is associated with. The source router is further configured to add or include in the data packet the destination zone-ID and to send the data packet towards a destination router having the assigned destination zone-ID included in the data packet.

According to an embodiment, the source router is configured to determine, from the routing table, whether there is at least a next hop router before reaching the destination zone-ID assigned to the destination router; and if there is at least a next hop router before reaching the destination zone-ID assigned to the destination router, the source router is configured to send the data packet to the next hop router.

The next hop router is configured to determine if the destination zone-ID in the received data packet differs from the zone-ID assigned to the next hop router, and if the destination zone-ID in the received data packet differs from the zone-ID assigned to the next hop router, determining from the routing table of the next hop router, the address of the subsequent next hop router to which the data packet including the destination zone-ID is to be sent.

According to an embodiment, if the subsequent next hop router is the destination router, the destination router is configured to remove the destination zone-ID from the received data packet, and forward the data packet to the destination address of the host belonging to the network having the network ID.

According to another aspect of embodiments herein, there is provided a method for routing of data packets in a network topology, the method comprising: assigning, to each router in the network topology, at least one zone-ID; building, for each zone-ID, a zone table including at least the zone-ID, receiving at a router, each zone table from all routers belonging the network topology; building, at the router, a topology zone table including information from each received zone table and transmitting the topology zone table to all routers in the topology; building, for each router, a routing table so that the routers can reach each other; receiving, at a source router, a data packet from a host belonging to a network having a network ID; determining, from the topology zone table, to which destination zone-ID the destination address or the network ID is associated with; adding or including the destination zone-ID to the data packet and sending the data packet towards a destination router having the assigned destination zone-ID indicated in the data packet.

According to another aspect of embodiments herein, there is provided a router for routing packets in a network topology comprising a plurality of routers, the router being assigned at least one zone-ID, the router comprising a processor and a memory containing instructions executable by the processor wherein the router is operative to: build a zone table including at least the zone-ID; receive from each router having an assigned zone-ID in the topology a zone table; building a topology zone table including information from each received zone table; and transmit the topology zone table to all routers in the topology; and build a routing table for communicating with said plurality of routers.

An advantage with embodiments herein is that less consumption of resources is used since the protocol or method used does not require running of additional protocols.

Another advantage is that when the data packet leaves the source router, the destination address of the host to which the data packet is to be delivered is not used by any hop router, except for the destination router. A hop router or transit router only needs to determine from its routing table the address of next hop router to which the data packet is to be sent.

Another advantage is that the routing tables are smaller in size as compared to prior art routing tables. This is since the routing table according to embodiments herein does not include network IDs. This means that all network IDs associated to a zone can be merged to just one entry which is the zone-ID. This leads to that the routing is quicker as decision making in each router is fast. Also, less CPU and RAM resources are required by each router.

Another advantage with embodiments herein is there is no need to replace the zone-IDs for each data packet passing a router. Hence, the source router includes a zone-ID and only the destination router needs to remove the zone-ID. Intermediate routers do not change the content of the data packet by, e.g., replacing the zone-ID with another zone-ID.

Additional advantages achieved by the disclosure will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
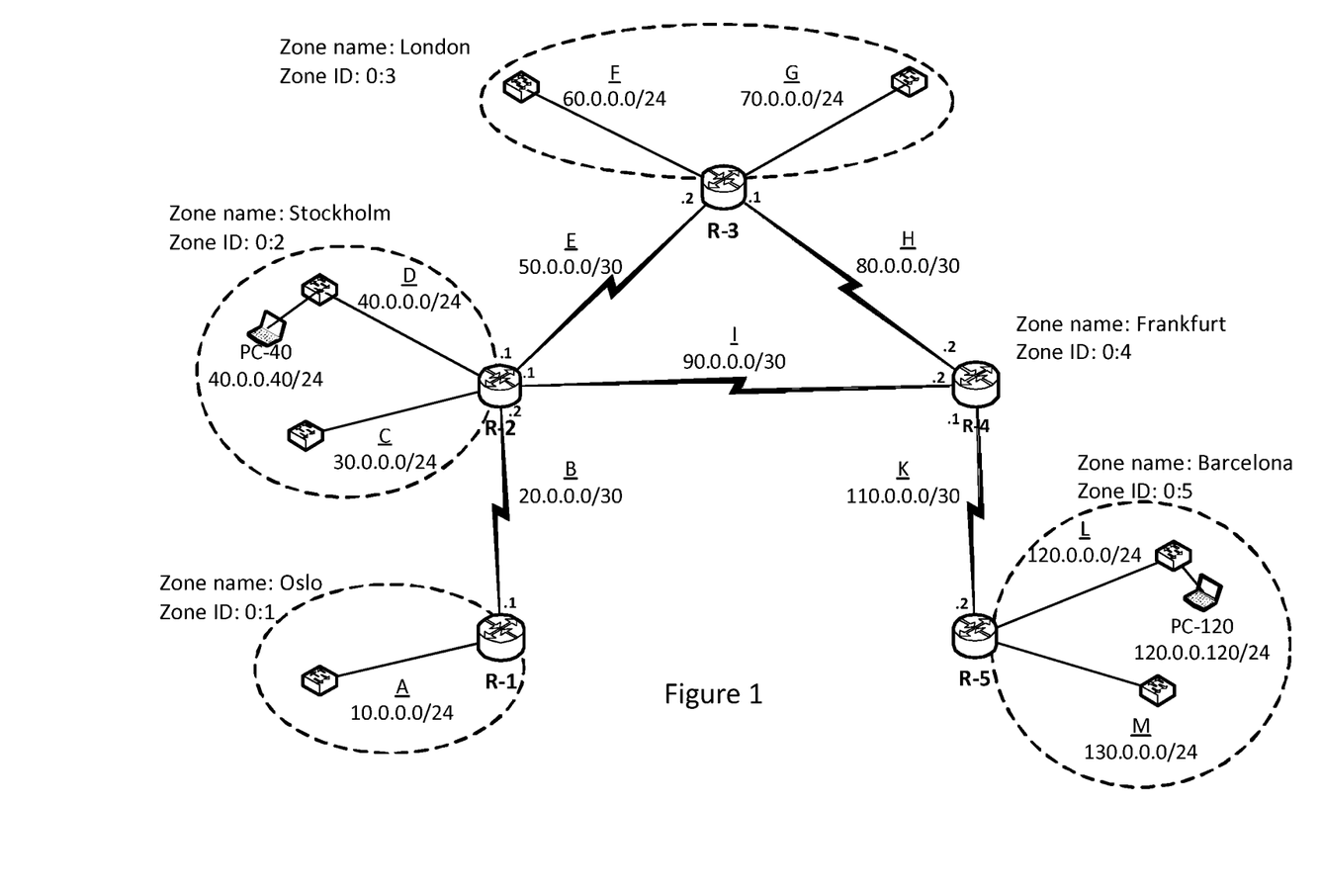
FIG. 1 is an example of a network topology wherein embodiments of the present disclosure may be employed.

Referring to FIG. 1, there is illustrated an example of a network or system topology wherein embodiments herein may be employed.

Hereinafter, is described, according to embodiments herein, a new method for routing data packets in a network topology. The method may be referred to as ZLSRP which stands for Zone-based Label Switching Routing Protocol. The routing decisions performed by routers are based on zone identification numbers or zone-IDs and not based on network-IDs as is normally performed in prior art routing methods. The following terminology is used in relation to FIG. 1:

Zone, Zone name and Zone-ID: a zone refers to a logical boundary. FIG. 1 shows examples of five zones named, London, Stockholm, Frankfurt, Oslo and Barcelona. Each zone has at least one (unique) zone-ID. Zone Oslo has zone-ID 0:1; zone Stockholm has zone-ID 0:2, . . . , and zone Barcelona has zone-ID 0:5. The zone-ID is assigned to the router dedicated to the zone. For example, zone Oslo has zone-ID 0:1 and the router dedicated to it is router R-1 as shown in the figure. Router R-2 is dedicated to zone Stockholm (zone-ID 0:2), Router R-3 is dedicated to zone London (zone-ID 0:3); Router R-4 is dedicated to zone Frankfurt (zone-ID 0:4) and R-5 is dedicated to zone Barcelona (zone-ID 0:5). A zone may include a leaf network as described below. Note that the network topology may include any number of zones.

Leaf Network: Networks A, C and D are three examples of leaf-networks. A leaf network refers to a network that is directly connected to just one router. In the figure, a leaf network is shown including a switch. F, G, K, L and M are also leaf networks. As shown, leaf network A connected to router R-1 within zone Oslo (zone-ID 0:1) has a network address 10.0.0.0/24. Leaf network C within zone Stockholm (zone-ID 0:2) connected to router R-2 has a network address 30.0.0.0/24. Within zone Stockholm, yet another Leaf network is shown connected to the same router R-2 and has address 40.0.0.0/24. To leaf network D is connected a host PC-40 having network address 40.0.0.40/24. However, a zone does not necessarily include leaf networks. Zone Frankfurt (Zone-ID 0:4) is an example of such a zone.

Transit Network: Networks B, E, H, I, K are examples of transit networks. A transit network here refers to the interface between two routers. For example, transit network B has network address 20.0.0.0/30 and is the interface network between router R-1 (of zone Oslo) and router R-2 (of zone Stockholm).

Source Router: It refers to the first router which is used as default gateway for every host on the connected leaf networks. As an example, if PC-40 on leaf network D wants to send a packet outside of its subnet, R-2 is the source router.

Destination Router: It refers to the last router that is directly connected to a destination host on a leaf network. As an example, if PC-120 on leaf network L in zone Barcelona is the destination host for a packet, router R-5 is the destination router.

Transit Router: It refers to a router along the path between a source router and a destination router. A transit router just routes traffic to a next router which can be a transit router or a destination router. For example, if PC-40 (in zone Stockholm) wants to send a packet to PC-120 (in zone Barcelona), source router R-2 may send the packet to destination router R-5 via transit router R-4 or via transit routers R-3 and R-4.

As will be described, the topology further comprises a router acting as a Zone-Table Primary Router (ZPR) in accordance with an embodiment herein. This router is configured to build or generate a topology zone table that includes information received from each router. The ZPR is also configured to update the topology zone-table in case there are changes in the network and to send the updated table to all the routers.

In addition to the ZPR a Zone-Table Backup Router (ZBR) may be provided as backup router for the ZPR.

In the following, an overview of a method based on ZLSRP will be described in accordance with some embodiments herein followed by an example applying the principles of the present disclosure in a network topology such as the one shown in FIG. 1.

The overview steps of ZLSRP include:

1) Defining and/or assigning at least one (unique) zone-ID to each router.

2) If a zone includes at least one leaf network, a network ID of the leaf network is also assigned and may be advertised. As an example, for zone-ID 0:1 (Oslo) leaf network A is assigned to zone 0:1 and has network ID 10.0.0.0/24. Note that this ID is in the form of an IP address of leaf network A.

3) According to an embodiment, for each zone, a zone table is built or formed and registered in the router of the zone. The zone-ID and at least the network ID (if the zone includes a leaf network) are used to build the zone table. As an example, router R-1 of zone-ID 0:1 (Oslo) registers/builds a zone table including zone-ID 0:1 and (leaf) network 10.0.0.0/24. The zone table may also include the name of the zone. Below is an example of a zone table (Zone-T) that is registered/built in R-1:

| R-1: Zone-T | | |
| --- | --- | --- |
| Zone name | Zone-ID | (Leaf) Networks |
| Oslo | 0:1 | 10.0.0.0/24 |

The zone table build by router R-2 is as shown below:

| R-2: Zone-T | | |
| --- | --- | --- |
| Zone name | Zone-ID | (Leaf) Networks |
| Stockholm | 0:2 | 30.0.0.0/24 |
|  |  | 40.0.0.0/24 |

4) According to an embodiment, zone tables are exchanged between all routers belonging to the network topology. This is performed in order for each router to have a complete zone table including individual zone tables of each router. Below is an example of a complete zone-table that each router will have after completion of convergence. Note that Frankfurt does not include a leaf network (N/A) and hence only the zone-ID is indicated.

| Zone name | Zone-ID | (Leaf) Networks |
|---|---|---|
| Oslo | 0:1 | 10.0.0.0/24 |
| Stockholm | 0:2 | 30.0.0.0/24 |
|  |  | 40.0.0.0/24 |
| London | 0:3 | 60.0.0.0/24 |
|  |  | 70.0.0.0/24 |
| Frankfurt | 0:4 | N/A |
| Barcelona | 0:5 | 120.0.0.0/24 |
|  |  | 130.0.0.0/24 |

According to another embodiment each router sends it zone table to the ZPR. This is used by the ZPR to build a topology zone table based on all information received from all routers and the ZPR is further configured to send the topology zone table to all routers. The topology zone table is similar to the one shown above.

5) Each router in the topology is configured to run a routing protocol, for example, RIP, OSPF, EIGRP and so on, to start negotiating with neighboring routers to build a routing table so that the routers can reach each other, i.e. so each router knows how different routers based on zone IDs can reach each other. The routing table however does not need information about the leaf networks of each zone, which makes a routing table according to an embodiment of the present disclosure simpler compared to prior art routing tables. In this example, RIP is chosen. However, any suitable routing protocol may be used.

It is here considered that by default, in ZLSRP, all interfaces are in active mode which means a router actively tries to advertise its zone-ID from all interfaces with source IP address of that interface. By IP address of an interface is meant the IP address related to a transit network. Below is an example of a routing table (Routing-T) of R-2 of zone Stockholm having zone-ID 0:2.

| R-2: Routing-T |||| 
|---|---|---|---|
| Best Route | Zone ID | From/To | Cost |
| * | 0:1 | 20.0.0.1 | 1 |
| * | 0:2 | Directly Connected | 0 |
| * | 0:3 | 50.0.0.2 | 1 |
|  | 0:3 | 90.0.0.2 | 2 |
| * | 0:4 | 90.0.0.2 | 1 |
|  | 0:4 | 50.0.0.2 | 2 |
| * | 0:5 | 90.0.0.2 | 2 |
|  | 0:5 | 50.0.0.2 | 3 |

(* indicates the best route from R-2 to another zone in the topology)

As shown in the routing table of R-2, assume that a packet generated by a host in zone 0:2 (Stockholm) is to be delivered to a host in zone London (zone-ID 0:3) then there are two routing ways to deliver the packet. The shortest way which is the preferred one is to use transit network 50.0.0.0/30 and deliver the data packet to IP address 50.0.0.2 of router R-3. The cost of this transmission is 1 as indicated in the Routing-T of R-2 above. Cost indicated as 0 means that we are within the same zone (zone-ID 0:2) i.e. directly connected to it.

The other routing way is to use transit network (I) 90.0.0.0/30 and transit network (H) 80.0.0.0/30. Hence the packet is first delivered to router R-4 using IP address 90.0.0.2 and from there router R-4 routes further the data packet to R-3 using IP address 80.0.0.1. Hence, the cost for this transmission is 2. Note that the left column "Best Route" of Routing-T is not necessary to have in the table since the "cost" column may instead be used to determine which route is the best. It is also clear from Routing-T that it is significantly smaller than prior art routing tables since Routing-T does not include information on (leaf) networks in terms of destination addresses or source addresses.

6) After the topology zone table and routing table are created by ZLSRP we are now ready to trace a traffic flow in accordance with some embodiments herein.

In the following an example of applying the principles of the present disclosure in a network topology such as the one shown in FIG. 1 is presented. It is assumed that PC-40 in zone "Stockholm" wants to send a data packet or data frame to PC-120 in zone "Barcelona". It should be mentioned that any type of service may be used such as transmission of emails, messages, files etc.

a) PC-40 creates or assembles a data packet in order to send it to PC-120. A structure of the data packet is shown below. Note that the structure is simplified. For example, the payload etc. is not shown. However, the simplified structure of the packet is only shown for understanding the teachings of the embodiments of the present disclosure.

| L2 || L3 |||
|---|---|---|---|---|
| Destination MAC | Source MAC | Source IP | Destination IP | FCS |
| R2 mac | PC-40 mac | 40.0.0.40 | 120.0.0.120 | X |

As shown, the data packet includes at Layer 2 (L2) the destination Medium Access Control (MAC) address of router R-2. This is because the destination IP address of PC-120 is not local so PC-40 sends the data packet to its configured default gateway or router R-2. The Source MAC address of PC-40 is only indicated at L2. The source IP address at Layer 3 (L3) is the IP address of PC-40. The destination IP address of PC-120 in zone "Barcelona" is also indicated at L3. FCS stands for Frame Check Sequence which may be used for error-detection.

b) R-2 in zone "Stockholm" receives the data packet from host PC-40 and looks on L3 to see that the destination IP address is 120.0.0.120 (of PC-120) indicated in bold and underlined in the data packet above.

c) R-2 also determines from zone table, Zone-T, to which destination zone-ID the destination IP address is associated with. Zone-T of R-2 is the topology zone table previously described which may be built by R-2 or may be received from the ZPR. Note that from the destination IP address in the data packet the network ID of the (leaf) network to which the PC-120 is connected can be easily determined. In other words, R-2 determines which Zone-ID includes the (leaf) network that is hosting this destination IP address 120.0.0.0.120. It is zone-ID 0:5 i.e. zone "Barcelona" as shown below (underlined in the table).

| Zone-T |||
|---|---|---|
| Zone name | Zone-ID | (Leaf) Networks |
| Oslo | 0:1 | 10.0.0.0/24 |
| Stockholm | 0:2 | 30.0.0.0/24 |
|  |  | 40.0.0.0/24 |

-continued

| Zone-T | | |
|---|---|---|
| Zone name | Zone-ID | (Leaf) Networks |
| London | 0:3 | 60.0.0.0/24 |
| | | 70.0.0.0/24 |
| Frankfurt | 0:4 | 100.0.0.0/24 |
| Barcelona | <u>0:5</u> | 120.0.0.0/24 |
| | | 130.0.0.0/24 | d) R-2 determines from its routing table (Routing-T) what the next hop is for zone-ID 0:5 and based on the Routing-T it is 90.0.0.2 belonging to transit network (I) in FIG. 1.

| R-2: Routing-T | | | |
|---|---|---|---|
| Best Route | Zone ID | From/To | Cost |
| * | 0:1 | 20.0.0.1 | 1 |
| * | 0:2 | Directly Connected | 0 |
| * | 0:3 | 50.0.0.2 | 1 |
| | 0:3 | 90.0.0.2 | 2 |
| * | 0:4 | 90.0.0.2 | 1 |
| | 0:4 | 50.0.0.2 | 2 |
| * | <u>0:5</u> | <u>90.0.0.2</u> | 2 |
| | 0:5 | 50.0.0.2 | 3 |

(* indicates best route from R-2 to another zone)

Now R-2 adds the destination Zone-ID, 0:5, to the data packet as Layer 2.5 (L2.5) as shown below, and R-2 sends the data packet to 90.0.0.2 towards the destination router having the assigned zone-ID 0:5 indicated in the data packet.

| L 2 | | L 2.5 | L 3 | | |
|---|---|---|---|---|---|
| Destination MAC | Source MAC | Destination Zone | Source IP | Destination IP | FCS |
| R-2 mac | R1 mac | <u>0:5</u> | 40.0.0.40 | 120.0.0.120 | X |

It should be noted that for the new packet the FCS needs to be recalculated. ZLSRP label in the packet here corresponds to 0:5. X label here means that the FCS is recalculated after inclusion of zone-ID 0:5 in the packet. Recalculation of the new FCS may be performed using any method.

e) In this example, it is router R-4 that receives the packet via interface (I) 90.0.0.0/30. Router R-4 is here a transit router since PC-120 is not in the zone of R-4.

Router R-4 looks at Layer 2.5 and since R-4 does not see its own zone-ID there, it directly determines from its routing table the next hop router for zone-ID 0:5, which is Router R-5 (see routing table of R-4 below) and sends the packet from its interface ID 110.0.0.1 via transit network K to R-5 interface ID 110.0.0.2.

| R-4: Routing-T | | | |
|---|---|---|---|
| Best Route | Zone ID | From/To | Cost |
| | 0:1 | 80.0.0.1 | 3 |
| * | 0:1 | 90.0.0.1 | 2 |
| * | 0:2 | 90.0.0.1 | 1 |
| | 0:2 | 80.0.0.1 | 2 |
| * | 0:3 | 80.0.0.1 | 1 |
| | 0:3 | 90.0.0.1 | 2 |

| R-4: Routing-T | | | |
|---|---|---|---|
| Best Route | Zone ID | From/To | Cost |
| * | 0:4 | Directly Connected | 0 |
| * | 0:5 | 110.0.0.2 | 1 |

(* indicates best route from R-4 of zone 0:4 to another zone)

Again, transit routers do not need to check or look at the (topology) zone table.

e) When the destination router R-5 receives the data packet, R-5 determines from the packet at L 2.5 that zone-ID is 0:5 i.e. own zone-ID. According to an embodiment, destination router R-5 removes from the packet the destination zone-ID 0:5 at L 2.5 and determines from L3 the destination address and forwards the packet to PC-120 having destination IP address 120.0.0.120. As network L (120.0.0.0/24) is directly connected to R-5, the data packet, without L 2.5 is forwarded to PC-120. The packet without L 2.5 is shown below.

| L 2 | | L 3 | |
|---|---|---|---|
| Destination MAC | Source MAC | Source IP | Destination IP |
| PC-120 mac | R-5 mac | 40.0.0.40 | <u>120.0.0.120</u> |

As previously described, all routers need to look at their routing table but only the source router needs to look at its zone table (Zone-T). A transit router looks at its routing table to determine the best path to reach the destination zone and sends the packet to the next hop router. The destination IP address of the host does not mean anything for the transit router. This makes the routing fast.

Another advantage is that routing tables are smaller unlike prior art routing tables. This is since a routing table according to embodiments herein does not include records about network IDs within the zones. Having smaller routing table requires less resources from the router to find the next hop router. Also, less entries help the routing protocol to make routing table faster requiring less processing.

Yet another advantage is that by isolating leaf networks from routing tables any changes on the leaf networks such as up/down do not affect the routing tables and there is no need that the routing protocol runs again. However, if a router's leaf network experiences issues, the router may send an updated zone table to other routers through multicasting or may send the update to the Zone-table Primary Router (ZPR). It means we have a much stable routing protocol because changing in routing tables are not needed. Further any update in a zone table does not trigger the routing protocol to run again to build a new routing table.

As previously described, instead of routers exchanging zone tables between each other, the ZPR may be used instead. Any of the routers in the network topology may be chosen as a ZPR. Hence in this embodiment, the ZPR receives zone tables from each router and builds or creates a topology zone table described earlier and sends to topology zone table to all routers with incremental version.

An advantage with this embodiment is that the use of a ZPR requires less signaling in the network. Another advantage is that, any change in leaf networks is only communicated to the ZPR and the ZPR is responsible to create an updated topology zone table (Zone-Table) and broadcast or multicast the updated version of the topology zone table to all routers. This can be performed periodically (e.g. every five minutes) or by trigger update in case of having update out of interval process.

In addition to the ZPR, a Zone-table Backup Router (ZBR) may be provided, as described earlier, as a backup router for the ZPR. Both ZPR and ZBR are synchronized with each other. Hence, in case of any issue for ZPR, ZBR takes responsibility and takes the role of ZPR and changes its role to ZPR and an election process may run to choose a new ZBR, for example:

A priority list may be used to assign the role of routers by command in ZLSRP. The roles may be assigned manually or automatically based on zone-ID. For example, the ZPR can have the highest assigned zone-ID whereas the ZBR, the lowest zone-ID. In case a router in the network topology loses its connection to the ZPR or the ZBR, the router may send a multicast query to all routers with the latest version of its local zone-table. If a receiver router has a zone table with the higher version, it will update the requester router.

Yet another advantage of embodiments herein is that unlike MPLS, there is no need to generate separate label(s) in each router. In other words there is no need to replace the zone-IDs for each data packet passing a router, and also there is no need for each transit router to recalculate the FCS field in the packet and update it as in the case in MPLS as transit routers need to change the MPLS label. In ZLSRP, the source router includes a zone-ID to the data packet and only the destination router needs to remove the zone-ID from that packet. Intermediate (transit) routers do not change the content of the data packet by, e.g., replacing the zone-ID with another zone-ID. There is also no need to have two separate routing protocols running in parallel like in MPLS. Running two protocols in the same router requires double resources. But using ZLSRP according to the present disclosure only one routing protocol is used making it easy to implement. Although a routing protocol like RIP is initially used to create routing tables in the present disclosure, this is different from the MPLS. In MPLS, first one needs to run a (mother) routing protocol completely with all its features totally separate and independent from MPLS and then separately configure the MPLS as a routing protocol with all its commands. Both the mother protocol and the MPLS protocol separately start to work and negotiate and make adjacency with neighbors and building their tables and running their algorithm. But in ZLPRS according to embodiments herein, only one routing protocol is used.

In MPLS every single network has a locally significant label but in ZLPRS several leaf networks are assigned to just one (unique) zone-ID in the whole network topology. Further, unlike other routing protocols, there is no need to have the information on networks in between routers in zone tables. But we know that in prior art routing protocols transit networks have to be part of the routing process and need to be advertised otherwise the routing protocol doesn't work. For instance in our example we don't need to have networks B, E, H, I, K in the routing table (unless we want to have access to a specific router for administration or configuration).

An additional advantage is that ACL (Access Control List), PBR (Policy Base Routing) and QoS (Quality of Service) can process much faster and efficiently when the filter is a group of networks. And the filter is applied on L 2.5, where the zone-ID is indicated according to an embodiment herein. Hence in many cases decision are made in L 2.5 instead of L3. For instance when an ACL/PBR is created on a router, ZLSRP automatically looks to see which IPs or networks are target for them. Then ZLSRP looks at its Zone-T and easily takes the corresponding zone-ID for that IP/Network. So when every packet reaches the routers there is no need to open all the packets and look at the L 3 and check the IP or network to see if ACL or PBR is applied for that or not. Instead a router opens the packet as its routing process and just go in deep in L 3 if the zone-ID labels are target for the ACL/PBR. Hence in ZLSRP we just look at a packet which is in target or destination network but in traditional routing protocol all packets need to be opened to see if they are target for ACL or not. Hence packet inspection is much less than in prior art protocols.

Figure 2:
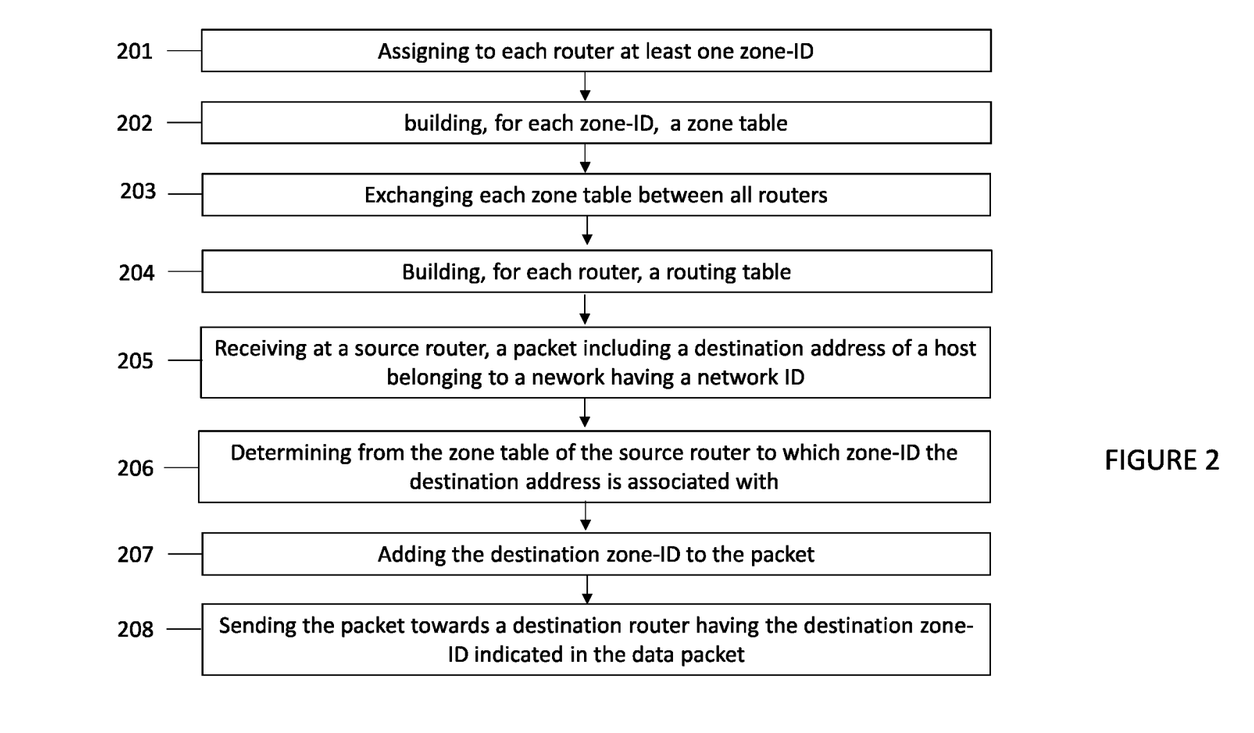
FIG. 2 illustrates a flowchart of a method according to embodiments of the present disclosure including the method performed by the source router.

Referring to FIG. 2, there is illustrated a flowchart of a method accordance with some embodiments herein.

As shown, the main steps comprise:

(201) assigning to each router at least one zone-ID; each zone has at least one unique zone-ID;

(202) building, for each (unique) zone-ID, a zone table including the zone-ID. It should be noted that if a leaf network is associated to a zone, the leaf network is assigned a network ID. The network ID corresponds to the (IP) address of the leaf network within the zone served by the router. In this case the zone table includes both the zone-ID and the network ID(s). As previously disclosed, a zone may include a plurality of leaf networks;

(203) exchanging each zone table between all routers. After convergence is complete, all routers will have similar topology zone table, Zone-T;

(204) building or forming, for each router, a routing table. RIP, OSPF, EIGRP etc. may be used/run for this purpose to start negotiation with neighbors to build a routing table so that routers can reach each other. Note however that a routing table does not include any information on leaf networks;

(205) receiving at a source router, a data packet from a host belonging to a zone of the source router, wherein the data packet includes a destination (IP) address of a host belonging to a network having a network ID. Hence here it is assumed that the destination zone includes at least one leaf network having a network ID;

(206) determining from the (topology) zone table of the source router to which destination zone-ID the destination address or the network ID is associated with;

(207) adding or including or injecting the destination zone-ID to the data packet, and (208) sending the data packet towards a destination router having the assigned destination zone-ID indicated in the data packet.

According to an embodiment, the source router determines, from the routing table, whether there is at least a next hop router (or transit router) before reaching the destination zone-ID, and if there is at least a next hop router (or transit router) before reaching the destination zone-ID, the source router sends the data packet to the next hop router.

There is also provided a system wherein method steps presented above are performed. The system being configured to assign, to each router in the network topology, at least one zone-ID; build a zone table including the zone-ID; exchange each zone table between all routers belonging to the network topology; build, for each router, a routing table so that the routers can reach each other. A source router in the system is further configured or operative to: receive a data packet from a host belonging to a zone of the source router; wherein the data packet includes a destination address of a host belonging to a network having a network ID; determine, from the zone table of the source router, to which destination zone-ID the destination address or the network ID is associated with; add or include the destination zone-ID to the data packet; and send the data packet towards a destination router having the assigned destination zone-ID indicated in the data packet.

As previously described the source router is in the system configured to determine, from the routing table, whether there is at least a next hop router before reaching the destination zone-ID assigned to the destination router; and if there is at least a next hop router before reaching the destination zone-ID assigned to the destination router, the source router is configured to send the data packet to the next hop router. Further the next hop router in the system is configured to determine if the destination zone-ID in the received data packet differs from the zone-ID assigned to the next hop router, and if the destination zone-ID in the received data packet differs from the zone-ID assigned to the next hop router, determining from the routing table of the next hop router, the address of the subsequent next hop router to which the data packet including the destination zone-ID of the is to be sent. If the subsequent next router is the (final) destination address, it is configured to remove the destination zone-ID from the data packet, and forward the data packet to the destination address of the host belonging to the network having the network ID.

Exchange of zone tables between routers, according to this embodiment, is performed until all routers in the topology or system have the same information on all zone-IDs and associated network IDs, thereby forming a topology zone table.

Figure 3A:
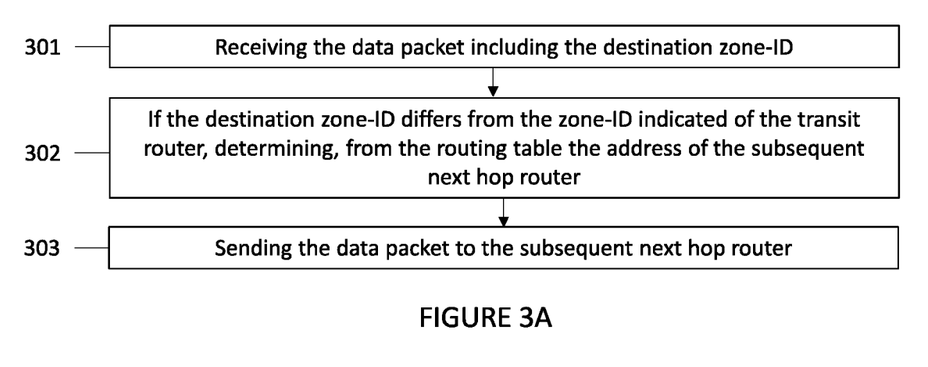
FIG. 3A illustrates a flowchart of a method performed by a transit router or next hop router according to an embodiment herein.

Referring to FIG. 3A, there is illustrated a flowchart of a method performed by a transit router or next hop router according to an embodiment herein.

(301) receiving the data packet including the destination zone-ID;

(302) if the destination zone-ID differs from the zone-ID assigned to the transit router; determining, from the routing table the address of a subsequent next hop router; and (303) sending the data packet including the destination zone-ID to the subsequent next hop router.

Figure 3B:
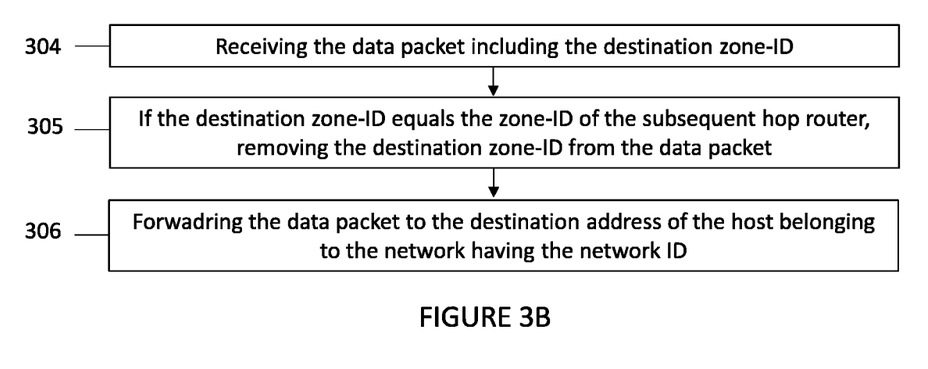
FIG. 3B illustrates a flowchart of a method performed by a destination router according to an embodiment herein.

Referring to FIG. 3B, there is illustrated a flowchart of a method performed by the subsequent next hop router according to an embodiment herein.

(304) receiving the data packet including the destination zone-ID;

(305) if the destination zone-ID equals the zone-ID assigned to the subsequent next hop router (which means that the subsequent next hop router is the destination router); removing the destination zone-ID form the data packet; and (306) forwarding the data packet to the destination address of the host belong to the (leaf) network having the network ID.

Figure 4:
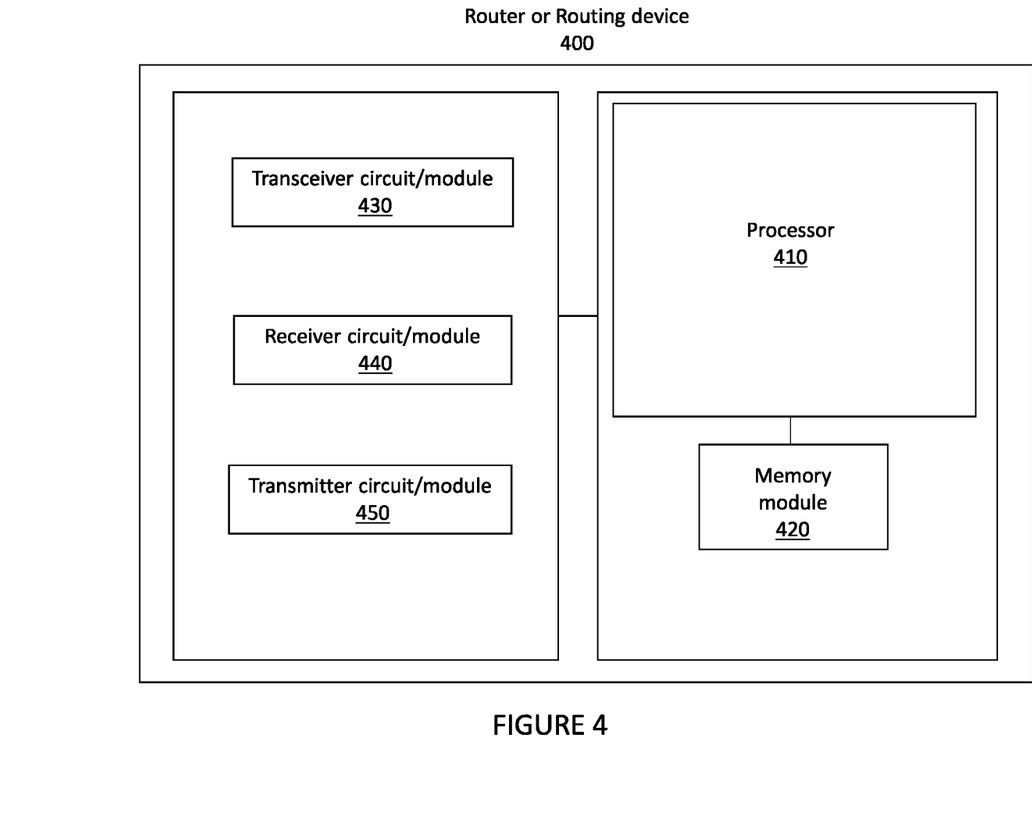
FIG. 4 illustrates a block diagram of a router or routing device according to some embodiments herein.

To perform the method described herein, a router or routing device 400 is provided as depicted in FIG. 4. The router 400 comprises a processing circuit or a processing module or a processor 410; a memory module 420; a transceiver circuit or transceiver module 430; a receiver circuit or receiver module 440; and a transmitter circuit or transmitter module 450, where the transceiver circuit 430 may include the receiver circuit 440 or the transmitter circuit 450. The router 400 may be a wireless router or fix router that can be connected through cables to hosts and to other network devices. The router 400 may support any radio access technology including 2G, 3G, 4G, 5G, Wifi, Wimax or a combination thereof.

The processing module/circuit 410 includes a processor, microprocessor, an application specific integrated circuit (ASIC), field programmable gate array (FPGA), or the like, and may be referred to as the "processor 410." The processor 410 controls the operation of the router 400 and its components. Memory (circuit or module) 420 includes a random access memory (RAM), a read only memory (ROM), and/or another type of memory to store data and instructions that may be used by processor 410. In general, it will be understood that the router 400 in one or more embodiments includes fixed or programmed circuitry that is configured to carry out the operations in any of the embodiments disclosed herein.

The processor 410 configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 410 to carry out the operations of the router 400 disclosed herein. Further, it will be appreciated that the router 400 may comprise additional components not shown in FIG. 4.

The router 400 is assigned at least one zone-ID. The zone-ID(s) and possible network ID(s) may be stored in the memory 420. The router 400 by means of processor 410 is operative build a zone table including the zone-ID. If the zone includes at least one leaf network, the network ID of the leaf network is also included in the zone table. The processor 410 is also configured, by means of receiver module 440 and transmitter module 450 to exchange the zone table with a plurality of routers in the network topology. The processor 410, by means of receiver module 440 is configured to receive, from each router in the network topology, a zone table; and the processor 410 is configured to build a routing table for communicating with the plurality of routers. The processor 410 is further configured, by means of receiver module 440, to receive a data packet from a host belonging to the zone of the router 400. The host is thus connected (wirelessly or by means of a cable) to the router 400. The received data packet includes a destination address of a host belonging to a network having a network ID.

The processor 410 is further operative to determine, from the topology zone table, to which destination zone-ID the destination address or the network ID is associated with. The processor 410 is further operative to add or include the destination zone-ID (retrieved from the zone table) in the data packet; and to send, by means of transmitter module 450, the data packet towards a destination router having the assigned zone-ID indicated in the data packet. The router 400 is further configured to determine from the routing table whether there is at least a next hop router (transit router) before reaching the destination zone-ID assigned to the destination address, and if there is at least a next hop router (transit router) before reaching the destination zone-ID assigned to the destination address, the router 400 is configured to send the data packet to the next hop router. According to an embodiment, the processor 410 is configured to add the destination zone-ID to the data packet at Layer 2.5.

There is also provided a computer program comprising instructions which when executed on at least one processor 410 of the router 400 according to embodiments herein, cause the at least one processor 410 to carry out the method previously described. Also a carrier containing the computer program is provided, wherein the carrier is one of a computer readable storage medium; an electronic signal, optical signal or a radio signal.

Figure 5:
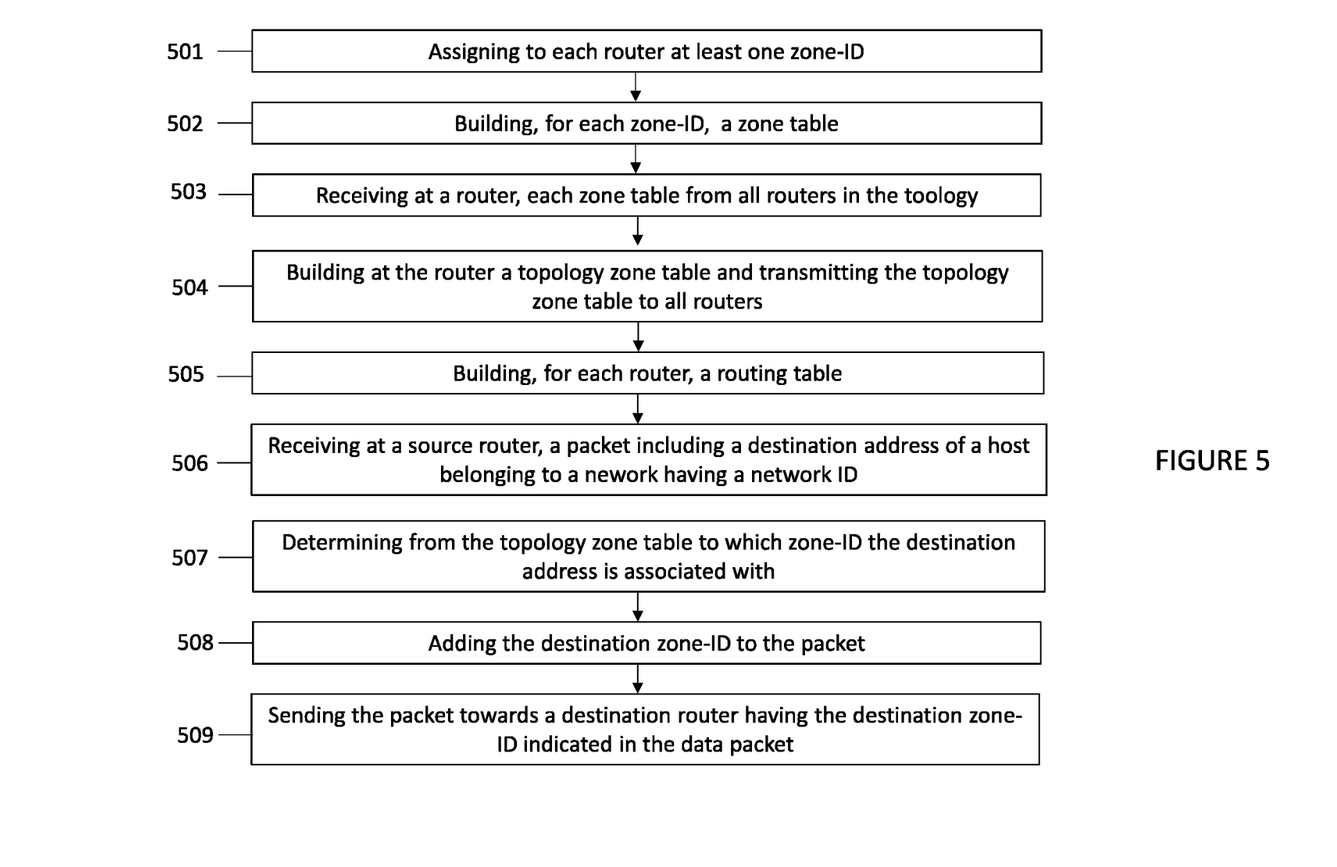
FIG. 5 illustrates a flowchart of another method according to embodiments of the present disclosure.

Referring to FIG. 5 there is illustrated a flowchart of a method accordance with some embodiments herein. In this case, the ZPR is used as previously described.

As shown, the main steps comprise:

(501) assigning to each router at least one zone-ID;

(502) building, for each zone-ID, a zone table including the zone-ID. It should be noted that if a leaf network is associated to a zone, the leaf network is assigned a network ID. The network ID corresponds to the (IP) address of the leaf network within the zone served by the router of the zone. In this case the zone table includes both the zone-ID and the network ID(s). As previously disclosed, a zone may include a plurality of leaf networks;

(503) receiving, at a router (ZPR), each zone table from all routers belonging to the network topology;

(504) building at the router (ZPR) a topology zone table including information from each received zone table; and transmitting the topology zone table to all routers in the topology.

(505) building, for each router, a routing table. RIP, OSPF, EIGRP etc. may be used/run for this purpose to start negotiation with neighbors to build a routing table so that routers can reach each other. Note however that a routing table does not include any information on leaf networks;

(506) receiving at a source router, a data packet from a host belonging to zone of the source router, wherein the data packet includes a destination (IP) address of a host belonging to a network having a network ID; Hence here it is assumed that the destination zone includes a leaf network having a network ID.

(507) determining from the topology zone table of the source router to which destination zone-ID the destination address or the network ID is associated with;

(508) adding or including or injecting the destination zone-ID to the data packet, and (509) sending the data packet towards a destination router having the assigned destination zone-ID indicated in the data packet.

Figure 6:
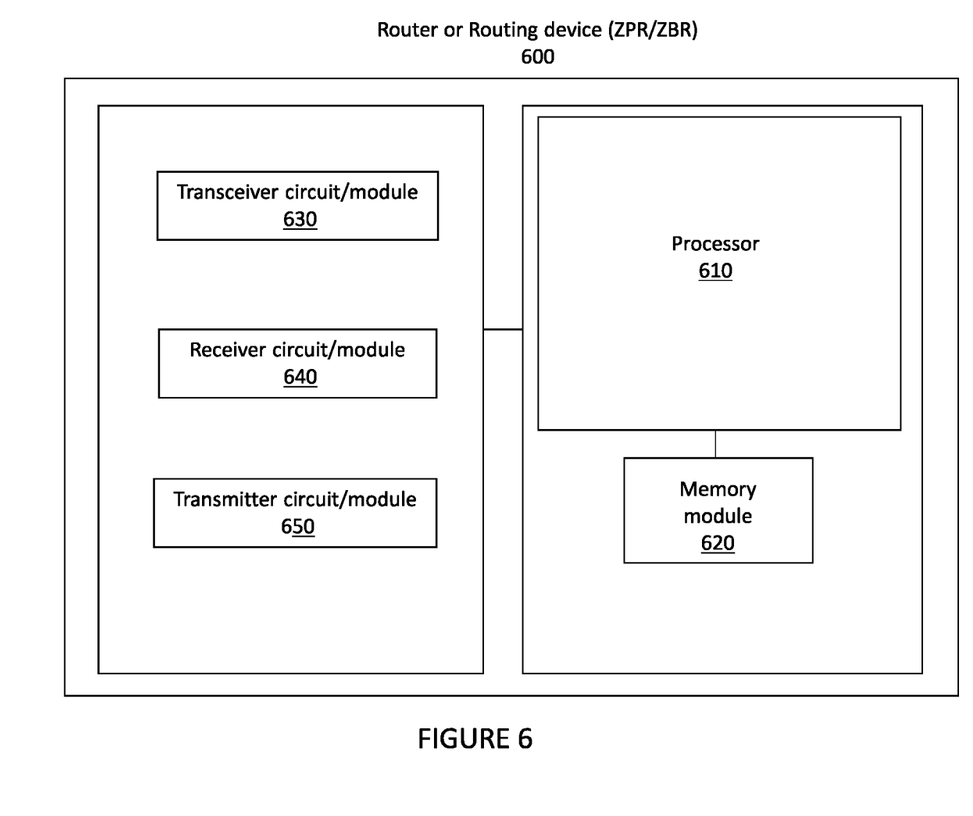
FIG. 6 illustrates a block diagram of a router or routing device according to some embodiments herein.

To perform the method described above regarding the ZPR, a ZPR router or routing device 600 is provided as depicted in FIG. 6. The ZPR 600 comprises a processing circuit or a processing module or a processor 610; a memory module 620; a transceiver circuit or transceiver module 630; a receiver circuit or receiver module 640; and a transmitter circuit or transmitter module 650, where the transceiver circuit 630 may include the receiver circuit 640 and the transmitter circuit 650. The router 600 may be a wireless router or fix router that can be connected through cables to hosts and to other network devices. The ZPR 600 may support any radio access technology including 2G, 3G, 4 G, 5G, Wifi, Wimax or a combination thereof.

The processing module/circuit 610 includes a processor, microprocessor, an application specific integrated circuit (ASIC), field programmable gate array (FPGA), or the like, and may be referred to as the "processor 610." The processor 610 controls the operation of the router 600 and its components. Memory (circuit or module) 620 includes a random access memory (RAM), a read only memory (ROM), and/or another type of memory to store data and instructions that may be used by processor 610. In general, it will be understood that the router 600 in one or more embodiments includes fixed or programmed circuitry that is configured to carry out the operations in any of the embodiments disclosed herein.

The processor 610 configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 610 to carry out the operations of the router 600 disclosed herein. Further, it will be appreciated that the router 600 may comprise additional components not shown in FIG. 6.

As previously, each router in the topology is configured to build an own zone table based zone-ID and possibly network ID(s). The ZPR 600 is also assigned at least one (unique) zone-ID which is used to build a zone table. The zone-ID(s) and possible network ID(s) may be stored in the memory 620. The processor 610 is also configured, by means of receiver module 440 to receive from each router a zone table. The ZPR 600 by means of processor 610 is further configured to build a topology zone table including information from each received zone table and to transmit, by means of transmitter module 450, the topology zone table to all routers in the topology. The processor 610 is further configured to build a routing table for communication with the other routers in the network topology.

If the ZPR 600 acts as a source router, the processor 610 is configured, by means of receiver module 640, to receive a data packet from a host belonging to the zone of the ZPR 600. The data packet includes a destination address of a host belonging to a network having a network ID.

The processor 610 is further operative to determine, from the topology zone table, to which destination zone-ID the destination address or the network ID is associated with. The processor 610 is further operative to add or include the destination zone-ID (retrieved from the topology zone table) in the data packet; and to send, by means of transmitter module 650, the data packet towards a destination router having the assigned zone-ID indicated in the data packet. The ZPR 600 is further configured to determine from the routing table whether there is at least a next hop router (transit router) before reaching the destination zone-ID assigned to the destination address, and if there is at least a next hop router (transit router) before reaching the destination zone-ID assigned to the destination address, the router 600 is configured to send the data packet to the next hop router. According to an embodiment, the processor 610 is configured to add the destination zone-ID to the data packet at Layer 2.5.

The processor 610 is also configured to update the topology zone table when the ZPR receives from at least one router an update of its zone table and the ZPR 600 is configured to send the updated topology zone table to all routers in the network topology. The ZPR 600 is also configured to synchronize with another router acting as a backup router (ZBR).

There is also provided a computer program comprising instructions which when executed on at least one processor 610 of the router 600 according to embodiments herein, cause the at least one processor 610 to carry out the method previously described. Also a carrier containing the computer program is provided, wherein the carrier is one of a computer readable storage medium; an electronic signal, optical signal or a radio signal Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for routing of data packets in a network topology, the method comprising:
   assigning, to each router in the network topology, at least one zone identification number, zone-ID;
   building, for each zone-ID, a zone table including at least the zone-ID;
   exchanging each zone table between all routers belonging to the network topology;
   receiving, at each router, each zone table from all routers belonging to the network topology;
   building, at each router, a topology zone table including information from each received zone table and storing the same topology zone table in each router, the information including a fixed zone ID associated with each router;
   building, for each router, a routing table so that the routers can reach each other each entry of the routing table comprising a destination zone-ID;
   receiving, at a source router, a data packet from a host belonging to a zone of the source router, the data packet including a destination address of a host belonging to a network having a network ID;
   determining, from the topology zone table stored in the source router, to which destination zone-ID the destination address or the network ID is associated with;
   adding or including the destination zone-ID to the data packet; and
   sending the data packet towards a destination router having the assigned destination zone-ID indicated in the data packet.

2. The method according to claim 1, wherein sending the data packet includes:
   determining, from the routing table of the source router, whether there is at least a next hop router before reaching the destination zone-ID; and
   if there is at least a next hop router before reaching the destination zone-ID:
      sending the data packet to the next hop router.

3. The method according to claim 2, further comprising:
   determining, by the next hop router, if the destination zone-ID in the received data packet differs from the zone-ID assigned to the next hop router, and
   if the destination zone-ID in the received data packet differs from the zone-ID assigned to the next hop router:
      determining from the routing table of the next hop router, the address of a subsequent next hop router to which the data packet including the destination zone-ID is to be forwarded to; and
      sending the data packet to the subsequent next hop router.

4. The method according to claim 3, further comprising:
   if the subsequent next hop router is the destination router:
      removing, by the destination router, the destination zone-ID from the data packet; and
      forwarding the data packet to the destination address of the host belonging to the network having the network ID.

5. The method according to claim 1, wherein adding the zone-ID to the data packet is performed at Layer 2.5.

6. The method according to claim 1, wherein each zone-ID is associated with a zone name.

7. The method according to claim 1, wherein exchanging zone tables between routers is performed until all routers in the topology have the same information on all zone-IDs and associated network IDs.

8. A router for routing data packets in a network topology comprising a plurality of routers, the router being assigned at least one zone identification number, zone-ID, the router comprising a processor and a memory, said memory containing instructions executable by the processor wherein the router is operative to:
   build a zone table including at least the zone-ID;
   exchange the zone table with said plurality of routers;
   receive zone tables from each of said plurality of routers;
   build a topology zone table including information from each received zone table and store the topology zone table, the information including a fixed zone ID associated with each router;
   build a routing table for communicating with said plurality of routers, each entry of the routing table comprising a destination zone-ID;
   receive a data packet from a host belonging to the zone of the router, wherein the data packet includes a destination address of a host belonging to a network having a network ID;
   determine, from the topology zone table stored in the router, to which destination zone-ID the destination address or the network ID is associated with;
   add or include the destination zone-ID in the data packet; and
   send the data packet towards a destination router having the assigned destination zone-ID indicated in the data packet.

9. The router according to claim 8, wherein the router is operative to:
   determine, from the routing table, whether there is at least a next hop router before reaching the destination zone-ID assigned to the destination router; and
   if there is at least a next hop router before reaching the destination zone-ID assigned to the destination router:
      the router is configured to send the data packet to the next hop router.

10. The router according to claim 8, wherein the router is operative to add the zone-ID to the data packet at Layer 2.5.

11. The router according to claim 8, wherein a zone-ID is associated with a zone name.

12. A system for routing of data packets in a network topology comprising a plurality of routers, the system being configured to:
   assign, to each router in the network topology, at least one zone identification number, zone-ID;
   build, for each zone-ID, a zone table including the zone-ID;
   exchange each zone table between all routers belonging to the network topology;
   receive, at each router, each zone table from all routers belonging to the network topology;
   build, at each router, a topology zone table including information from each received zone table and storing the topology zone table in each router, the information including a fixed zone ID associated with each router;
   build, for each router, a routing table so that the routers can reach each other, each entry of the routing table comprising a destination zone-ID;
   receive, at a source router in the system or network topology, a data packet from a host belonging to a zone of the source router, the data packet including a destination address of a host belonging to a network having a network ID;

determine, from the topology zone table stored in the source router, to which destination zone-ID the destination address or the network ID is associated with;

add or include the destination zone-ID to the data packet; and send the data packet towards a destination router having the assigned destination zone-ID indicated in the data packet.

13. The system according to claim 12, wherein the source router is configured to:
   determine, from the routing table, whether there is at least a next hop router before reaching the destination zone-ID assigned to the destination router; and
   if there is at least a next hop router before reaching the destination zone-ID assigned to the destination router:
   the source router is configured to send the data packet to the next hop router.

14. The system according to claim 12, wherein the next hop router is configured to:
   determine if the destination zone-ID in the received data packet differs from the zone-ID assigned to the next hop router, and
   if the destination zone-ID in the received data packet differs from the zone-ID assigned to the next hop router:
   determine from the routing table of the next hop router, the address of a subsequent next hop router to which the data packet including the destination zone-ID is to be sent.

15. The system according to claim 14, wherein if the subsequent next hop router is the destination router, the destination router is configured to remove the destination zone-ID from the data packet, and forward the data packet to the destination address of the host belonging to the network having the network ID.

16. The system according to claim 12, wherein the source router is configured to add the zone-ID to the data packet at Layer 2.5.

17. The system according to claim 12, wherein each zone-ID is associated with a zone name.

18. The system according to claim 12, wherein exchanging zone tables between routers is performed until all routers in the topology have the same information on all zone-IDs and associated network IDs.

19. A method for routing of data packets in a network topology, the method comprising:
   assigning, to each router in the network topology, at least one zone identification number, zone-ID;
   building, for each zone-ID, a zone table including at least the zone-ID;
   receiving at a router, each zone table from all routers belonging to the network topology;
   building, at the router, a topology zone table including information from each received zone table, the information including a fixed zone ID associated with each router, and transmitting the topology zone table to all routers in the topology;
   building, for each router, a routing table so that the routers can reach each other, each entry of the routing table comprising a destination zone-ID;
   receiving, at a source router, a data packet from a host belonging to a zone of the source router; wherein the data packet includes a destination address of a host belonging to a network having a network ID;
   determining, from the topology zone table stored in the source router, to which destination zone-ID the destination address or the network ID is associated with;
   adding or including the destination zone-ID to the data packet; and
   sending the data packet towards a destination router having the assigned destination zone-ID indicated in the data packet.

20. A router for routing data packets in a network topology comprising a plurality of routers, the router being assigned at least one zone identification number, zone-ID, the router comprising a processor and a memory, said memory containing instructions executable by the processor wherein the router is operative to:
   build a zone table including at least the zone-ID;
   receive, from each router having an assigned zone-ID in the topology, a zone table;
   build a topology zone table including information from each received zone table, the information including a fixed zone ID associated with each router, and transmit the topology zone table to all routers in the topology where it is stored; and
   build a routing table for communicating with said plurality of routers, each entry of the routing table comprising a destination zone-ID.

21. The router according to claim 20, wherein when acting as a source router, the router is configured to:
   receive a data packet from a host belonging to the zone of the router, wherein the data packet includes a destination address of a host belonging to a network having a network ID;
   determine, from the topology zone table, to which destination zone-ID the destination address or the network ID is associated with;
   add or include the destination zone-ID in the data packet; and
   send the data packet towards a destination router having the assigned destination zone-ID indicated in the data packet.

22. The router according to claim 20, further configured to:
   update the topology zone table when the router receives from at least one router in the topology, an update of its zone table; and
   send an updated zone table to all routers in the topology.

23. The router according to claim 20, further configured to synchronize with another router acting as a backup router.

* * * * *